C. A. SMITH.
Millstone-Dressing Machine.
No. 165,958. Patented July 27, 1875.
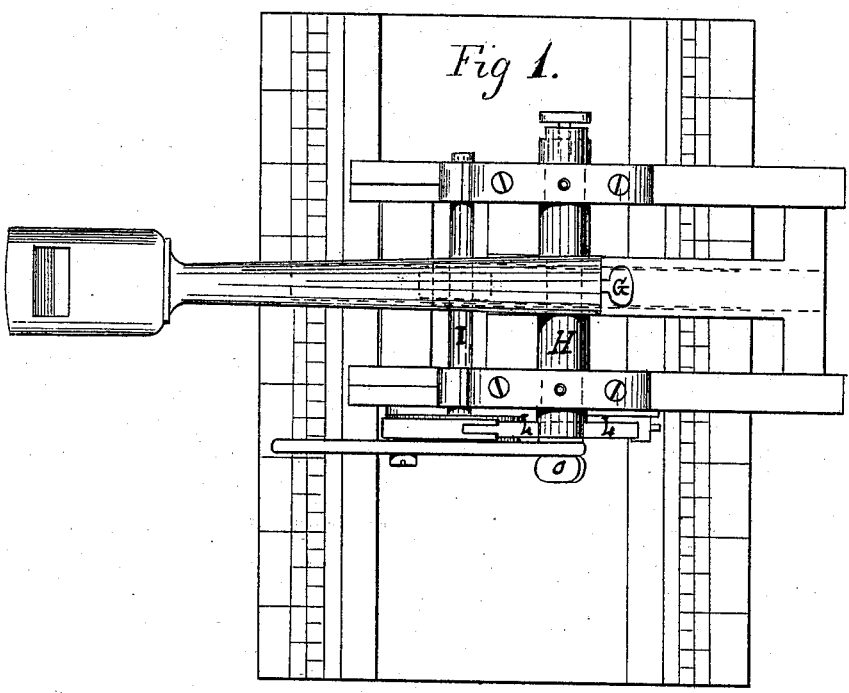
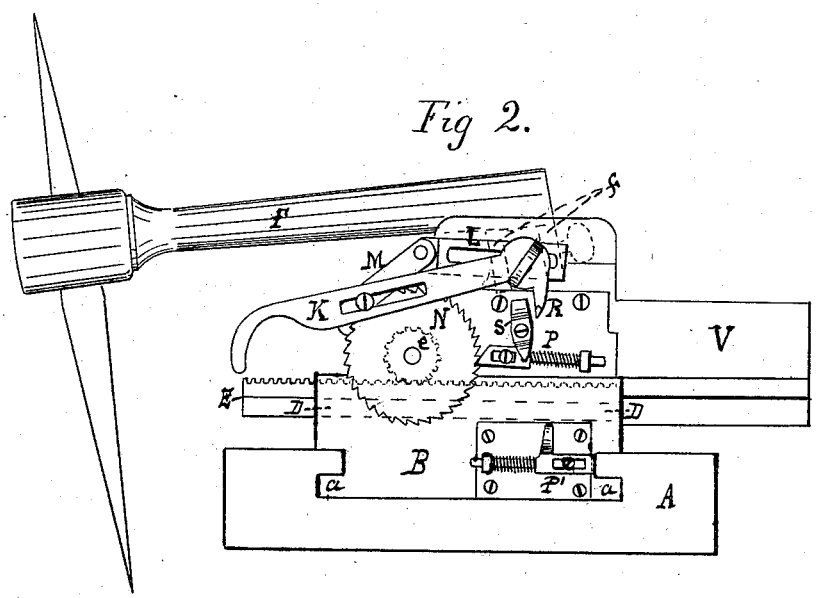
WITNESSES:
INVENTOR,
ATTORNEY.

UNITED STATES PATENT OFFICE.

CHARLES A. SMITH, OF LEBANON, MISSOURI.

IMPROVEMENT IN MILLSTONE-DRESSING MACHINES.

Specification forming part of Letters Patent No. 165,958, dated July 27, 1875; application filed July 1, 1875.

*To all whom it may concern:*

Be it known that I, CHARLES A. SMITH, of Lebanon, county of Laclede and State of Missouri, have invented an Improved Millstone-Dressing Machine.

The following description, taken in connection with the accompanying plate of drawings hereinafter referred to, forms a full and exact specification, wherein are set forth the nature and principles of the invention, by which the same may be distinguished from others of a similar class, together with such parts thereof as are claimed as new and are desired to be secured by Letters Patent of the United States.

My invention relates to that class of machines which are made use of for dressing millstones; and the nature thereof consists in certain improvements in the construction of the same, and novel combination of the parts thereof, hereinafter described.

In the accompanying plate of drawings, in which corresponding parts are designated by the same letters, Figure 1 is a plan view of the machine. Fig. 2 is a side elevation of the same.

A designates the bed-plate of the machine, which is rabbeted, so as to admit the lugs $a$ of the lower carriage B. The top carriage C and the lower carriage B are also rabbeted, as shown at D, so as to allow the former to ride in and upon the latter. E designates a rack, secured at the center of the lower carriage, in which works the pinion $e$. The said pinion is rigidly attached to the shaft I, which has its bearings in the rear of the upper carriage. F designates the pick-handle, one end of which is provided with a pair of lugs, $f$, which straddle the shaft H, and are secured thereto by the thumb-screw G. In the center of the shaft a recess is cut for the reception of said lugs $f$, and the top of the shaft has an oval frame, to fit the concave surface of the iron between the said lugs. The said shaft H has its bearings on the top of the upper carriage, and projects outward far enough to allow the lever K and arm L to be attached thereto by the thumb-screws $o$. Both extremities of the said shaft have a recess for the reception of arm L. The arm L, to which the dog M is attached, is slotted, as shown in the drawing, so as to be capable of lateral adjustment, and thereby establish the height to which the pick must be raised to permit the said dog to catch in the ratchet-wheel N. P designates a dog, actuated by a spiral spring, and arranged upon the side of the upper carriage, which engages with the teeth of the ratchet-wheel upon the shaft I, thereby holding the said upper carriage in position, and preventing it from slipping backward when the dog M is playing back and forth. The said lever K is pivoted to one end of said shaft H by the screw $o$, and is attached to the dog M by means of a screw, the head of which slides in an elongated aperture cut in said lever.

The principal function of the lever is to throw the dog from the ratchet-wheel when it is desired to draw the upper carriage backward. This is effected by the lug R on the said lever, which presses against the upper arm of the short lever S, when the handle of the said lever is raised and throws the spring-dog P out of gear. The said short lever is pivoted to the upper carriage by means of a top bolt, and the lower end thereof works in a slot cut for its reception in said dog P.

P' designates a spring slide-bolt, the end of which is pressed against the bed-plate A by a coil-spring. The end of said slide-bolt is grooved, in such a manner as to fit corresponding grooves cut in the bed-plate.

The side movement of the lower carriage B is effected by drawing back the spring-bolt P', and pressing the said carriage sidewise with one hand while the pick is held up with the other. When the carriage has been moved as far as desired the spring is released, and the bolt will hold the said carriage in the desired position.

The bed-plate is graduated, just in front of the carriage, into inches and fractional parts of an inch, to indicate the adjustment of said lower carriage.

The operation of the machine will be understood by those skilled in the art to which the invention relates without further description.

Having thus described my invention, I claim and desire to secure by Letters Patent of the United States—

1. The combination of the ratchet-wheel N, lever K, dog M, slotted bar L, and shaft H, all operating together, as described.

2. The pick-handle F, provided with lugs f, the shaft H, and thumb-screw G, all combined and operating together, as described.

3. The combination of the spring-dog P, lever S, lever K, provided with lug R, thumb-screw o, slotted bar L, dog M, ratchet-wheel N, shafts I and H, pinion e, and rack E, all combined and operating together, as described.

In testimony that I claim the foregoing I have hereunto set my hand this 31st day of May, 1875.

CHARLES A. SMITH.

Witnesses:
W. I. WALLACE,
GEO. H. GREENLEAF.